United States Patent
Iwano et al.

(10) Patent No.: US 10,828,812 B2
(45) Date of Patent: Nov. 10, 2020

(54) MOLDED PART, MANUFACTURING METHOD OF MOLDED PART AND MOLD

(71) Applicant: CANON KABUSHIKI KAISHA, Tokyo (JP)

(72) Inventors: Takuya Iwano, Inagi (JP); Yukuo Yamaguchi, Tokyo (JP); Mikiya Umeyama, Tokyo (JP); Satoshi Oikawa, Yokohama (JP); Hiromasa Amma, Kawasaki (JP); Satoshi Kimura, Kawasaki (JP); Naoko Tsujiuchi, Kawasaki (JP); Yasushi Iijima, Tokyo (JP); Kyosuke Toda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 580 days.

(21) Appl. No.: 15/156,578

(22) Filed: May 17, 2016

(65) Prior Publication Data

US 2016/0346971 A1 Dec. 1, 2016

(30) Foreign Application Priority Data

May 25, 2015 (JP) .................................. 2015-105182

(51) Int. Cl.
  *B29C 45/00* (2006.01)
  *B29C 45/33* (2006.01)
  (Continued)

(52) U.S. Cl.
  CPC .......... *B29C 45/0062* (2013.01); *B29C 45/33* (2013.01); *B29C 2045/0063* (2013.01); *B29C 2045/2683* (2013.01); *B29L 2031/767* (2013.01)

(58) Field of Classification Search
  CPC combination set(s) only.
  See application file for complete search history.

(56) References Cited

U.S. PATENT DOCUMENTS

| 5,464,578 A | * | 11/1995 | Salter | ...................... B29C 45/16 264/250 |
| 7,780,280 B2 | * | 8/2010 | Warren | ................ B41J 2/17536 347/86 |

(Continued)

FOREIGN PATENT DOCUMENTS

JP 2002-178538 A 6/2002

OTHER PUBLICATIONS

Amma et al., U.S. Appl. No. 15/156,583, filed May 17, 2016.
(Continued)

*Primary Examiner* — Laura C Powers
(74) *Attorney, Agent, or Firm* — Venable LLP (57) ABSTRACT

A molded part including a first member having a plurality of openings and a second member contacting with a peripheral edge of each of the plurality of openings so as to cover the openings, and having a hollow portion formed by sealing the contact portion with a sealing material, wherein: the second member defines a flow channel for filling the sealing material between the first member and the second member; the second member has a branched shape in which sections corresponding to positions covering the plurality of openings are branched from each other, and portions near a gate of the flow channel are connected as a common section; and the branched shape has a bridge structure for connecting the respective branched sections.

5 Claims, 8 Drawing Sheets

(51) Int. Cl.
B29C 45/26 (2006.01)
B29L 31/00 (2006.01)

(56) References Cited

U.S. PATENT DOCUMENTS

2005/0264622 A1* 12/2005 Silverbrook ......... B41J 2/17546
347/86
2010/0171798 A1* 7/2010 Yamaguchi .......... B41J 2/16532
347/85
2011/0115850 A1* 5/2011 Kudo ...................... B29C 65/08
347/44

OTHER PUBLICATIONS

Oikawa et al., U.S. Appl. No. 15/151,880 filed May 11, 2016.
Iwano et al., U.S. Appl. No. 15/156,649, filed May 17, 2016.
Tsujiuchi et al., U.S. Appl. No. 15/157,909, filed May 18, 2016.
Kimura et al., U.S. Appl. No. 15/156,569, filed May 17, 2016.
Oikawa et al., U.S. Appl. No. 15/157,890, filed May 18, 2016.
Toda et al., U.S. Appl. No. 15/156,559, filed May 17, 2016.

* cited by examiner

MOLDED PART, MANUFACTURING METHOD OF MOLDED PART AND MOLD

BACKGROUND OF THE INVENTION

Field of the Invention

The present invention relates to a molded part having a hollow portion, a manufacturing method thereof, and a mold, and more particularly, relates to a liquid supply member having a liquid supply channel formed therein.

Description of the Related Art

A liquid supply member has been known as a typical molded part having a hollow portion. The liquid supply member is mounted on a liquid ejection head capable of ejecting the liquid supplied from the liquid container through an ejector. Inside the liquid supply member, a liquid supply channel is formed between the liquid container and the ejector. The liquid ejection head may be an inkjet print head capable of ejecting ink (liquid) supplied from an ink tank (liquid container) through a plurality of ejection ports (ejectors). The print head capable of ejecting the ink of a plurality of types is provided with an ink supply member (liquid supply member) formed with the plurality of ink supply channels (liquid supply channels) corresponding to the ink of the respective types. Each of the ink channels is formed so as to bend.

Generally, in most cases, the resin molded part has been used for the ink supply member with the ink supply channel from the viewpoint of easy manufacturing method, lightweight, and corrosion resistance. The aforementioned bent ink channel is constituted by molding a plurality of divided parts of the liquid supply channel, and thereafter, by assembling respective parts through ultrasonic welding, adhesion by using the adhesive material, or the like.

Recently, the technology for molding a plurality of parts simultaneously in the mold so as to complete assembly of those parts has been known as the one for further simplifying the manufacturing method as disclosed in the related art document. With this technology, the method is implemented by simultaneously molding two parts for forming a hollow body (for example, the stereoscopic part having one open surface, and the part with size and shape sufficient to cover the open surface of the stereoscopic part) at positions displaced from each other in the same mold (primary molding), and the mold is opened once. At this time, one of the two parts is left at the fixed side of the mold, and the other part is left at the movable side of the mold. Any one of the parts at the corresponding side of the mold is shifted to reach the position so as to be brought into contact with the other part when the mold is closed again. The mold, then, is closed. In the aforementioned state, those two parts in contact with each other constitute the hollow body. However, the contact portion is still kept separated. Therefore, molten resin is supplied to the contact portion for adhesion and sealing to constitute the sealed hollow part (secondary molding). Application of the aforementioned technology allows execution of molding and assembling in the same mold even in the case of producing the liquid supply channel of the inkjet print head.

SUMMARY OF THE INVENTION

However, in the case of the complicated shape of the hollow part to be molded, producing the sealed hollow part by molding the stereoscopic molded body (housing) having a plurality of openings, and a lid-like molded body (lid member) with size and shape sufficient to cover the openings for assembly in the same mold may cause concerns as described below. That is, in the aforementioned case, the lid member has sections corresponding to the respective openings branched from one another, while leaving only a section close to the gate connected, which is configured with significantly weak strength. After molding the primary molded body, the lid member has to be retained at the movable side when opening the mold. In the aforementioned state, the mold release resistance may damage the section with substantially weak strength, thus causing the lid member to be left at the opposite side.

An object of the present invention is to solve the aforementioned problem by carrying out the primary molding of two or more parts, and assembling the parts in the secondary molding in the same mold so as to improve filling properties of the sealing material.

The molded part according to the present invention to achieve the above object comprises a first member having a plurality of openings and a second member contacting with a peripheral edge of each of the plurality of openings so as to cover the openings, and having a hollow portion formed by sealing the contact portion with a sealing material, wherein: the second member defines a flow channel for filling the sealing material between the first member and the second member; the second member has a branched shape in which sections corresponding to positions covering the plurality of openings are branched from each other, and portions near a gate of the flow channel are connected as a common section; and the branched shape has a bridge structure for connecting the respective branched sections.

The structure according to the present invention ensures to prevent damage to the member upon opening of the mold subsequent to the primary molding, and improve filling properties of the sealing material upon secondary molding.

Further features of the present invention will become apparent from the following description of exemplary embodiments (with reference to the attached drawings).

DESCRIPTION OF THE EMBODIMENTS

Prior to description of an embodiment according to the present invention, the manufacturing method of a hollow body having a hollow portion therein as disclosed in, for example, Japanese Patent Laid-Open No. 2002-178538 will be described. The manufacturing method (die slide injection molding) allows sequential execution of injection molding of a plurality of parts, and joining those parts in the same mold.

In the aforementioned manufacturing method, two parts for constituting the hollow body (for example, one with an opening, and the other functioning to cover the opening) are placed at positions displaced from each other inside a pair of molds (fixed-side mold and movable-side mold), and subjected to injection molding, respectively (primary molding). Upon opening of the mold thereafter, one of those two parts is left in the fixed-side mold, and the other part is left in the movable-side mold. The movable-side mold is slidably shifted so as to cause the part remaining in the fixed-side mold and the part remaining in the movable-side mold to face each other. The molds are then closed. At this moment, the two parts are brought into contact with each other to form the hollow body, but are not joined yet. The molten resin (secondary resin) is applied to the contact portion for bonding those parts to form the hollow body (secondary molding).

In the case where the part to be molded having a complicated shape with partially weak strength is subjected to the primary molding, the resultant part may be found damaged upon opening of the mold. Alternatively, in the case where such part is subjected to the secondary molding, filling properties of the molten resin (secondary resin) as the sealing material may be deteriorated.

The present invention has been made in view of the aforementioned findings.

An embodiment of the present invention will be described referring to the drawings. With respect to the embodiment of the molded part to be described hereinafter, the liquid supply member is exemplified by the ink supply member mounted on the inkjet print head.

First Embodiment

Figure 1A:
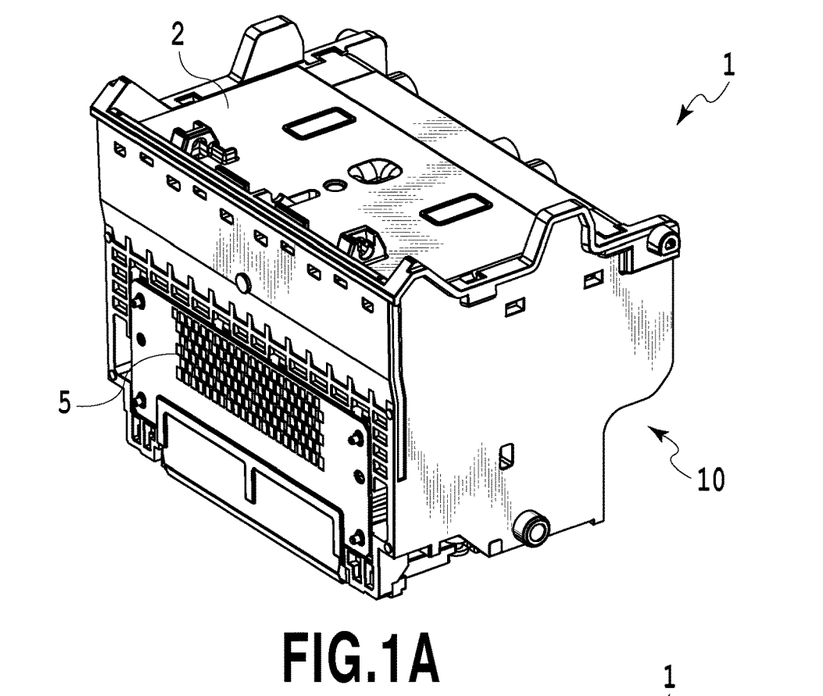
FIGS. 1A and 1B are perspective views of a print head with an ink supply member according to a first embodiment of the present invention.
Figure 1B:
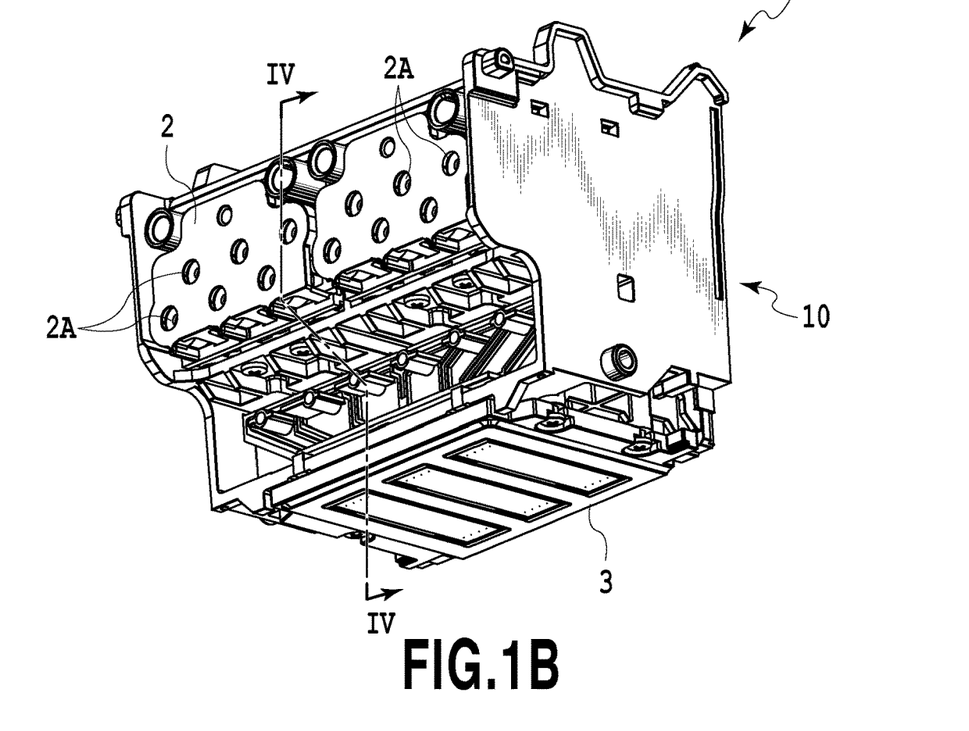

FIGS. 1A and 1B are perspective views of an inkjet print head (liquid ejection head) 1 with an ink supply member (liquid supply member) according to the present embodiment. The print head 1 of this example is mounted on a carriage of an inkjet print device (liquid ejection device) of so-called serial scan type. The print head 1 may be configured to be mounted on the full line type inkjet print device.

A sub-tank 2 is disposed at the upper side of the print head 1. Ink (liquid) contained in a not shown ink tank (liquid container) will be introduced from a not shown flow channel such as a tube to an ink inlet port (liquid inlet port) 2A of the sub-tank 2. A print element capable of ejecting the ink is provided on the lower surface of the print head 1 in the drawings. An ink supply member (liquid supply member) is disposed between the sub-tank 2 and the print element 3, which constitutes an ink supply channel (liquid supply channel).

Figure 2:
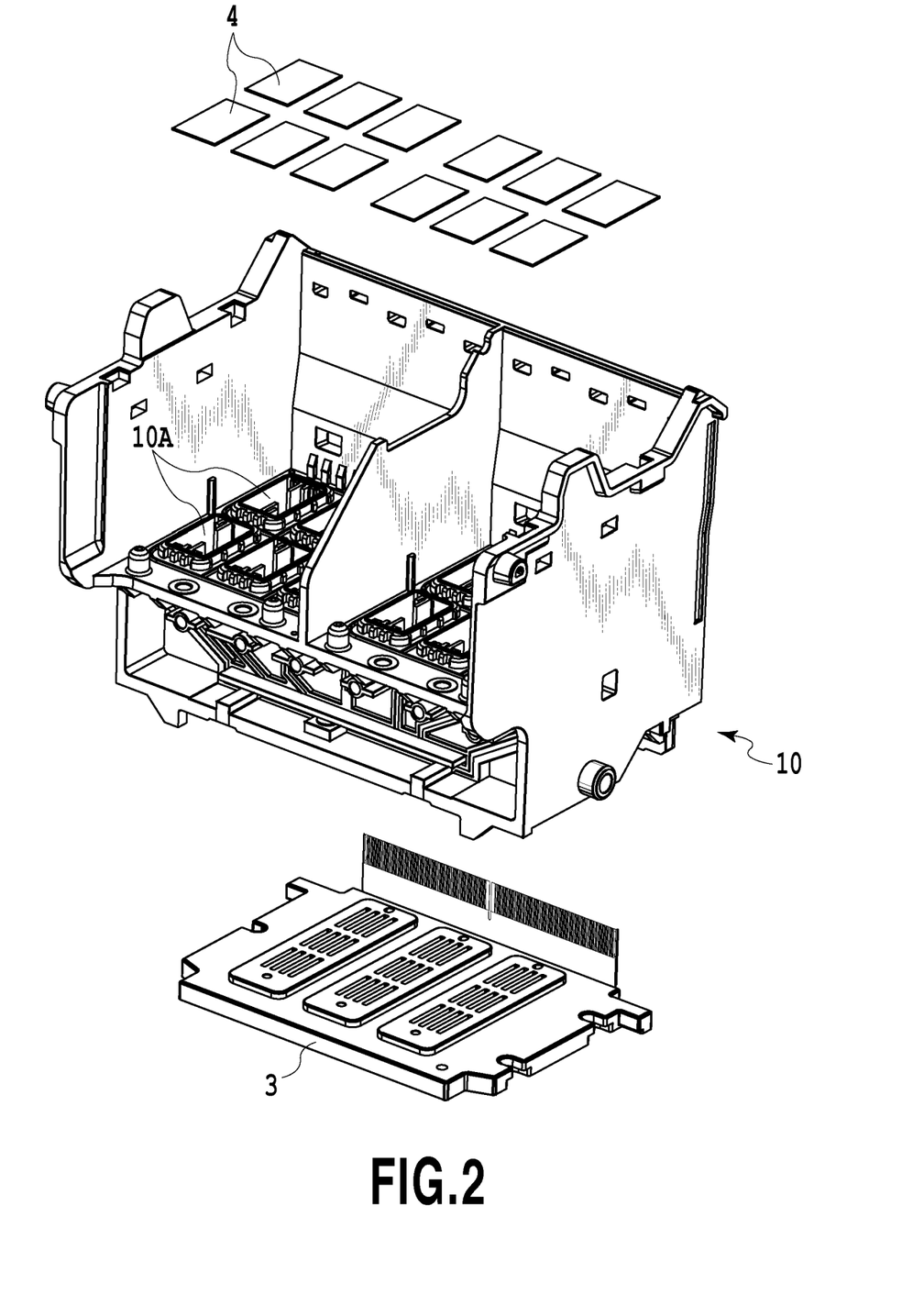
FIG. 2 is an exploded perspective view of the print head as shown in FIGS. 1A and 1B.
Figure 3:
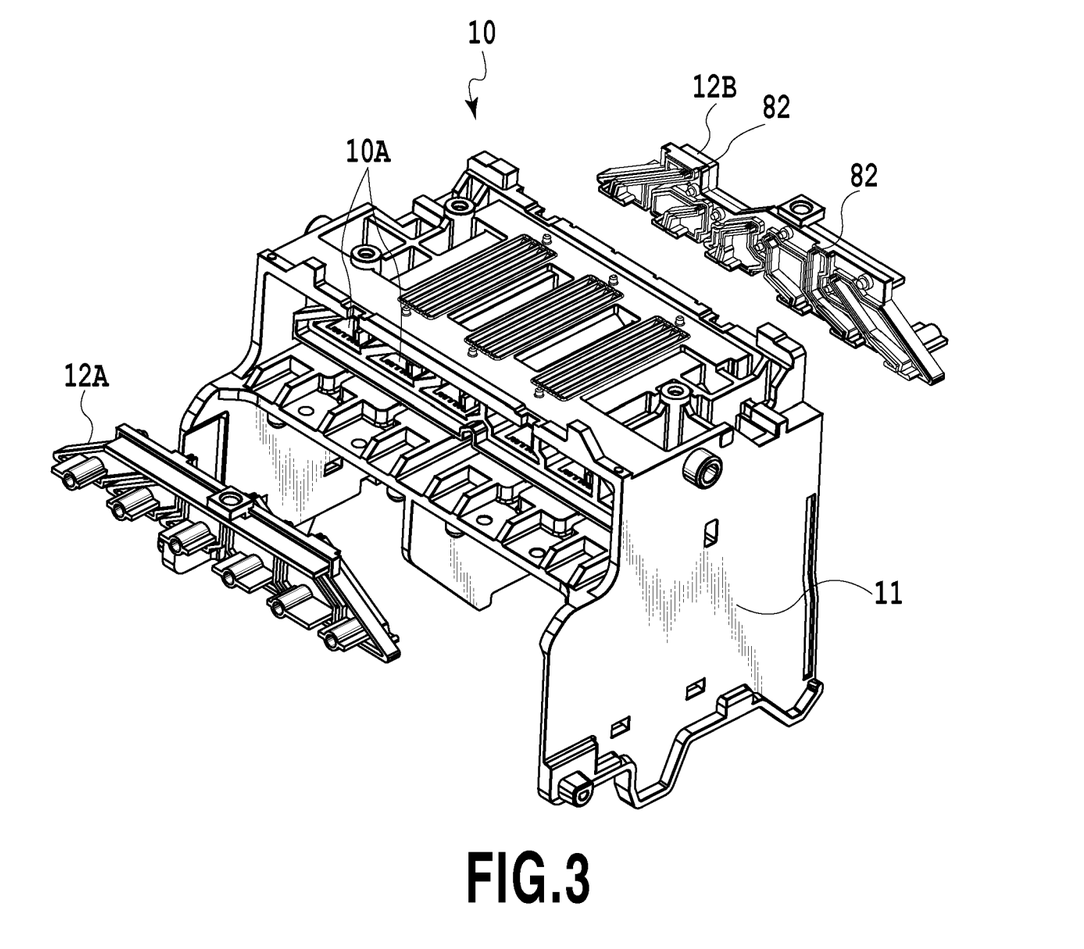
FIG. 3 is an exploded perspective view of the ink supply member as shown in FIGS. 1A and 1B.

FIG. 2 is a perspective view for explaining an inner structure of an ink supply member 10. FIG. 3 is an exploded perspective view of the ink supply member 10.

Filters 4 for removing foreign substance contained in the ink are provided at a position connected to the sub-tank 2 in the ink supply channel within the ink supply member 10 at the upstream side in the ink supply direction. Ink chambers (liquid chambers) 10A for temporarily storing the ink are formed in the ink supply channel at the position at the downstream side of the filter 4 in the ink supply direction.

The ink within the sub-tank 2 is introduced into the ink chambers 10A through the filters 4 by way of the ink supply channel so as to be supplied to the print element 3. The print element 3 has a plurality of ejection ports capable of ejecting the ink, arranged to form a not shown ejection port array. Each of the ejection ports is provided with an ejection energy generation element, for example, an electricity-heat conversion element (heater), piezoelectric element or the like. In this example, twelve ink inlet ports 2A of the sub-tank 2 in total will receive supply of twelve types of the ink in total, respectively. The ink of each type is supplied to the print element 3 through the corresponding ink supply channel so as to be ejected from the corresponding ejection port array. Accordingly, twelve filters 4 and twelve ink chambers 10A are provided, respectively. The ink supply channel formed in the ink supply member 10 includes the portion for communication between those twelve ink chambers 10A in total and the corresponding ejection port arrays. As each interval between the adjacent twelve ink chambers 10A in total among them is smaller than each interval between the adjacent ejection port arrays among them, the bent shaped portion is partially contained in the corresponding ink supply channel. A not shown print device serves to drive the ejection energy generation element through an electric connection board 5 (see FIG. 1A) so that the ink is ejected from the corresponding ejection port.

The ink supply member 10 is constituted by a plurality of components including a housing (first component) 11, and lid members (second components) 12A and 12B. The ink chamber 10A formed in the housing 11 includes an opening for accommodating the filter 4, another opening connected to the print element 3, and a third opening that is different from those two openings. The third opening is sealed by the lid members 12A and 12B to be described later. In this example, twelve ink chambers 10A in total are formed into two arrays each including six chambers. Each of the third openings for the six ink chambers 10A in one array is sealed by the lid member 12A. Likewise, each of the third openings for another six ink chambers 10A in the other array is sealed by the lid member 12B. Those lid members 12A and 12B will be collectively referred to as the lid member 12.

Figure 4:
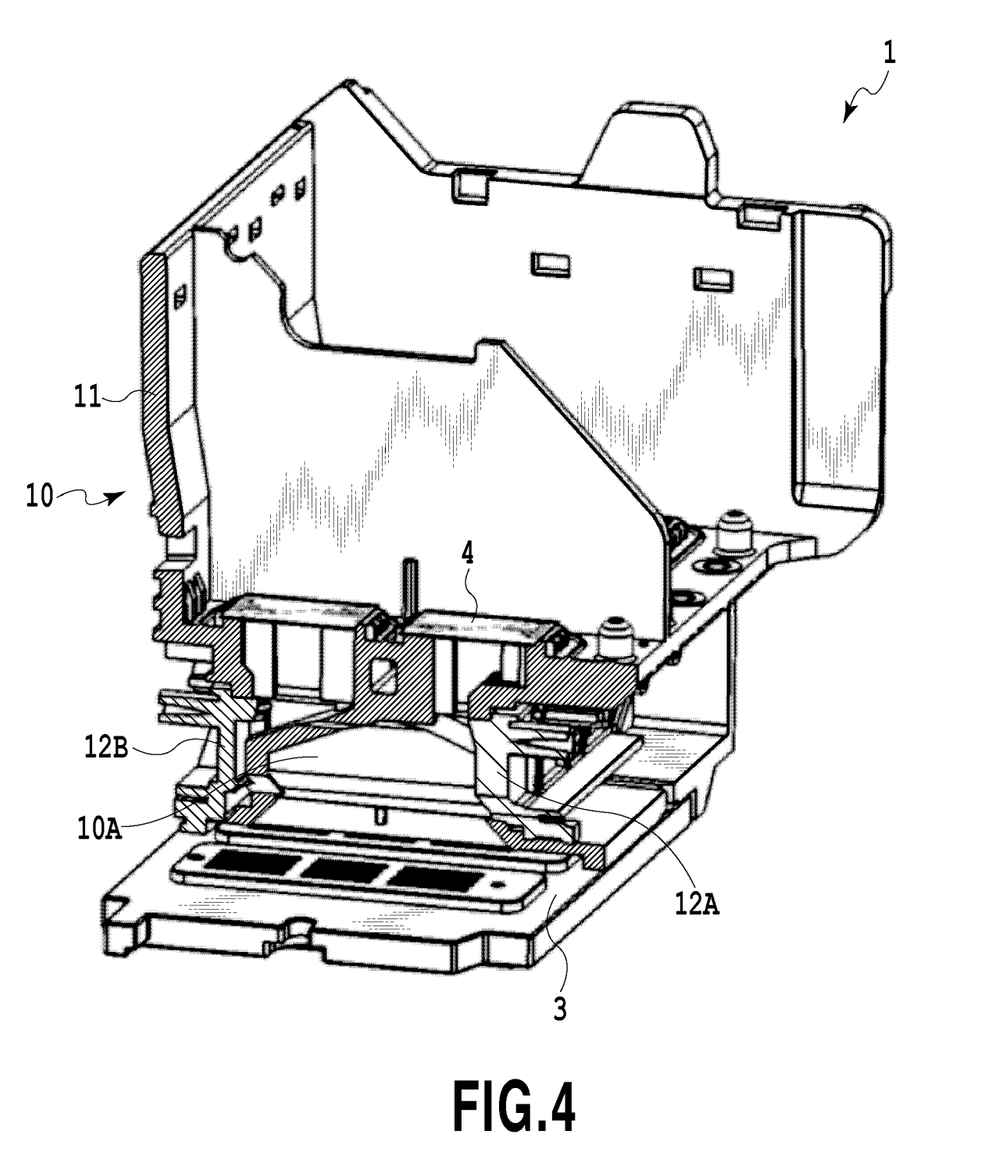
FIG. 4 is a perspective view of a cross section of the ink supply member as shown in FIGS. 1A and 1B.

FIG. 4 is a sectional view taken along line IV-IV of FIG. 1B for explaining the ink chamber 10A formed inside the housing 11 of the ink supply member 10. The ink introduced from the sub-tank 2 through the filters 4 is temporarily stored in the ink chamber 10A, and then ejected from the ejection port of the print element 3. Generally in most cases, the ink supply member 10 which constitutes the ink chamber 10A is formed as a resin molded article produced by injection molding from the viewpoint of easy manufacturing method, light-weight, and corrosion resistance. In this example, the ink chamber 10A for forming the ink supply channel has the opening at the side of the filter 4 differently shaped from the opening at the side of the print element 3. The inner surface of the portion between those two openings is formed by combining complicated surfaces. Upon injection molding of the housing 11 of the ink supply member 10 so as to position the aforementioned ink chamber 10A inside, the third opening that is different from those two openings has to be formed in one surface of the housing 11. After injection molding of the housing 11, the third opening is sealed by the lid member 12 (12A, 12B) to complete formation of the ink chamber 10A.

FIGS. 5A to 7B are explanatory views with respect to a basic manufacturing method of the aforementioned ink supply member 10. Those drawings sequentially illustrate each operation of a mold 20 for the respective cycles of manufacturing the ink supply member 10. A fixed-side mold 21 and a movable-side mold 22 which constitute the mold 20 according to the example have a first molding position P1 set for forming the housing 11 of the ink supply member 10, and a second molding position P2 set for forming the lid member 12.

Figure 5A:
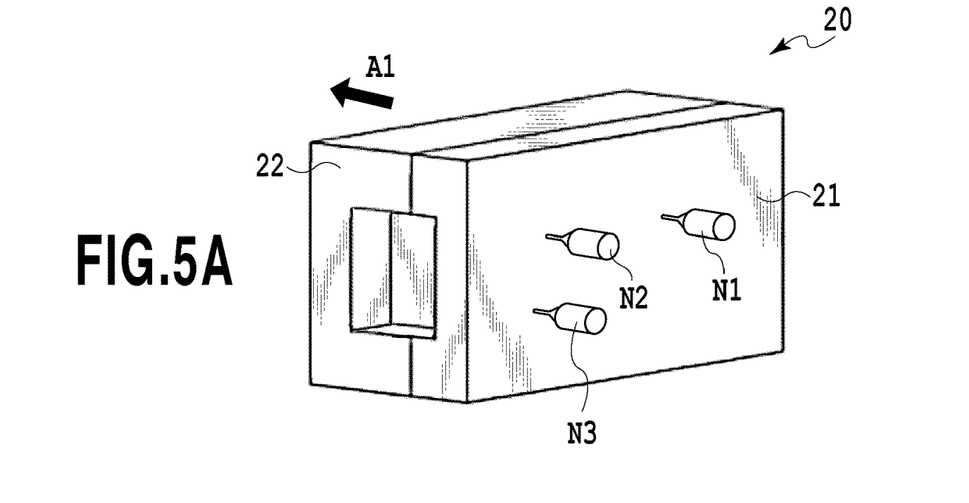
FIGS. 5A to 5C are perspective views of a mold in the respective steps for manufacturing the ink supply member as shown in FIGS. 1A and 1B.
Figure 5B:
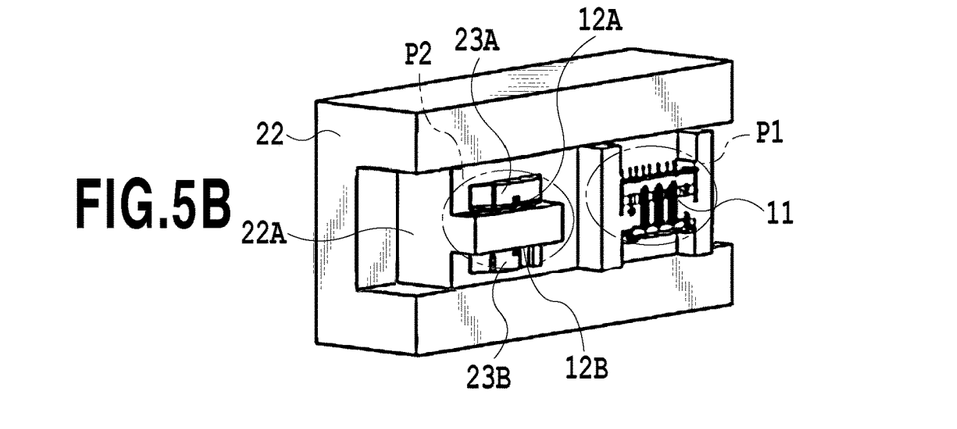
Figure 5C:
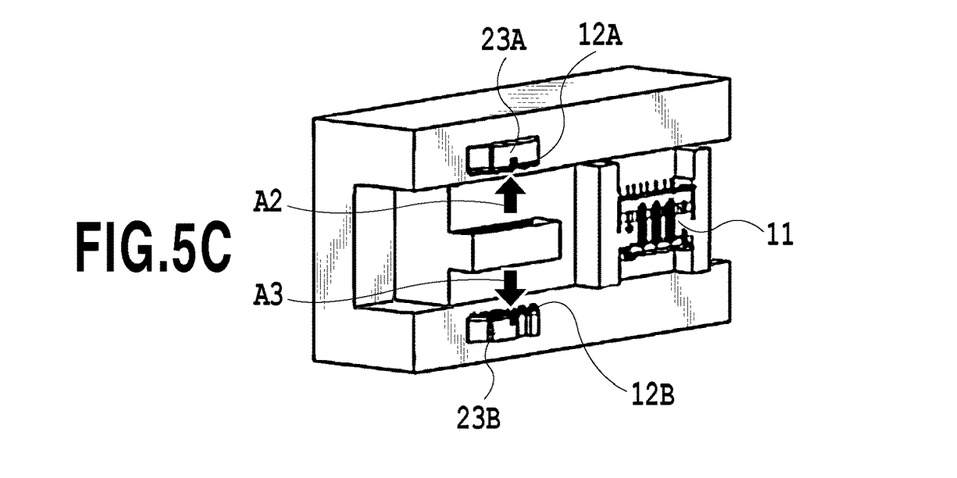

Referring to FIG. 5A, subsequent to closing of the fixed-side mold 21 and the movable-side mold 22, a molding resin (primary resin) is fed into the space between those molds through a gate portion from injection nozzles N1 and N2 (primary molding) so that the housing 11 of the ink supply member 10 is molded at the first molding position P1, and the lid member 12 is molded at the second molding position P2. Thereafter, the movable-side mold 22 is shifted toward the direction indicated by arrow A1 for mold opening. FIG. 5B is an explanatory view illustrating the inside of the movable-side mold 22 upon mold opening. The view of the fixed-side mold 21 is omitted.

At the second molding position P2, the lid members 12 (12A, 12B) are molded by corresponding mold pieces 23 (23A, 23B), and corresponding part of the movable-side mold 22. As FIG. 4 shows, the lid members 12A and 12B function in sealing the third opening of the ink chamber 10A on the far side of the housing 11. Referring to FIG. 5B, the lid members 12A and 12B are temporarily retracted toward directions indicated by arrows A2 and A3 while being retained with the mold pieces 23A and 23B. The mold pieces 23A and 23B are slid by a not shown part sliding mechanism with a drive source (for example, hydraulic cylinder) besides a mechanism for opening and closing the mold 20 so as to be retracted toward the directions indicated by arrows A2 and A3, respectively.

Figure 6A:
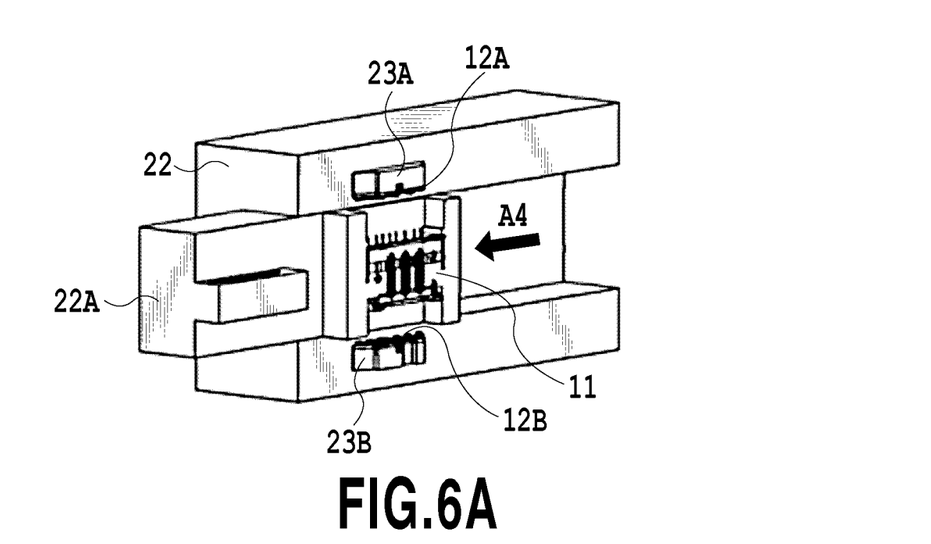
FIGS. 6A and 6B are perspective views of the mold in the respective steps for manufacturing the ink supply member as shown in FIGS. 1A and 1B.

Referring to FIG. 6A, after retracting the mold pieces 23A and 23B, the fixed-side mold 21 and the movable-side mold 22 are relatively shifted. In this example, a die slide mold 22A disposed within the movable-side mold 22 slides toward the direction indicated by arrow A4. The housing 11 is retained by the die slide mold 22A, and shifted together with the die slide mold 22A so that the third openings of the ink chambers 10A face the lid members 12A and 12B. The die slide mold 22A is slid by the mechanism with the drive source other than the mechanism for opening and closing the mold likewise the part sliding mechanism for the mold pieces 23A and 23B.

Figure 6B:
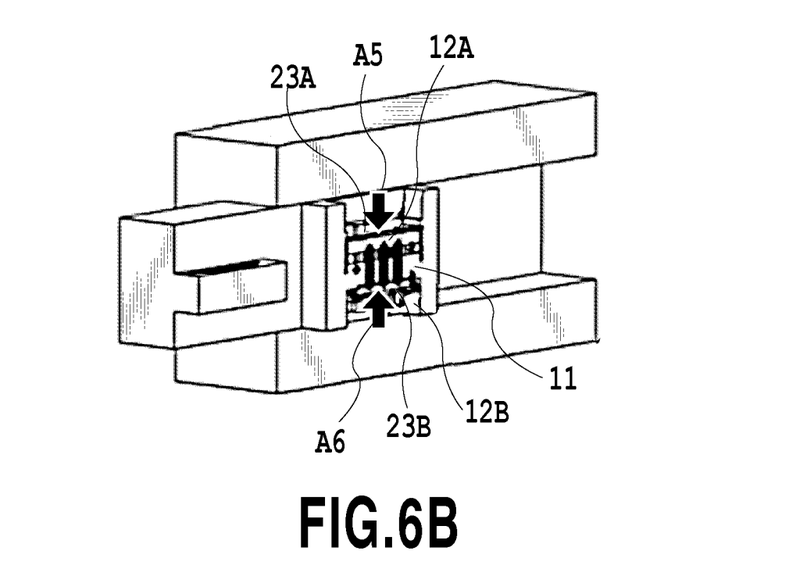

Thereafter, as shown in FIG. 6B, as the part sliding mechanism returns, the lid members 12A and 12B retained on the mold pieces 23A and 23B are shifted together toward directions indicated by arrows A5 and A6. The lid members 12A and 12B contact with the peripheral edges of the third openings of the corresponding ink chambers 10A of the housing 11.

Figure 7A:
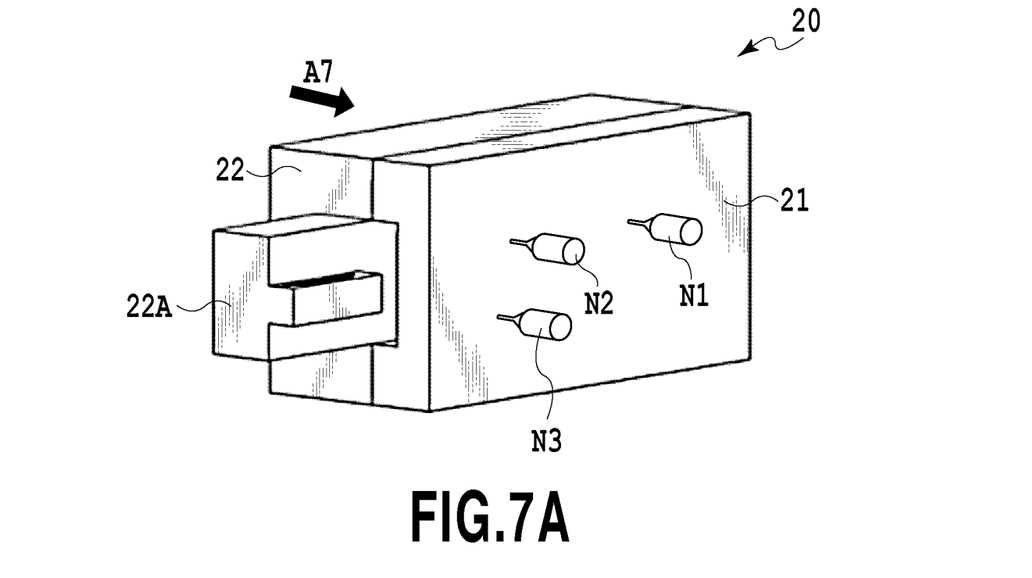
FIGS. 7A and 7B are perspective views of the mold in the respective steps for manufacturing the ink supply member as shown in FIGS. 1A and 1B.

At the second molding position P2 of the mold 20, the peripheral edge of the third opening of the ink chamber 10A in the housing 11 is brought into contact with the corresponding lid members 12A and 12B. Under the contact state, the movable-side mold 22 shifts toward the direction indicated by arrow A7 as shown in FIG. 7A for mold closing with the fixed-side mold 21. Thereafter, the sealing material (secondary resin) compatible with the housing 11 and the lid members 12A and 12B is fed into the contact portion between the peripheral edge of the third opening of the ink chamber 10A and the corresponding lid members 12A and 12B from an injection nozzle N3 (secondary molding). The peripheral edge of the third opening of the ink chamber 10A and the corresponding lid members 12A and 12B are joined by filling the gap therebetween with the secondary resin very tightly so that the third opening is sealed. As a result, the ink chamber 10A is sealed except the openings at the sides of the filter 4 and the print element 3, thus completing manufacturing of the hollow ink supply member 10.

Figure 7B:
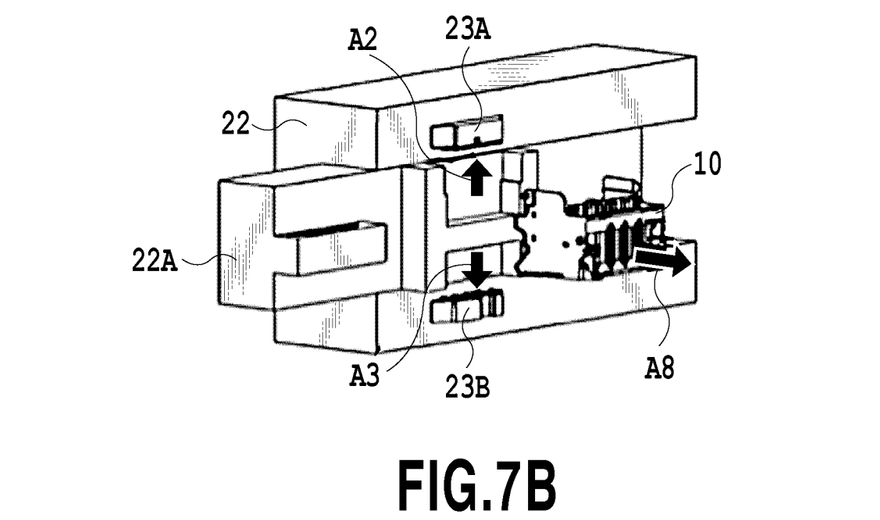

After opening the mold 20, the mold pieces 23A and 23B shift toward the directions indicated by arrows A2 and A3 as shown in FIG. 7B so that the finished ink supply member 10 with hollow structure is pushed out toward the direction indicated by arrow A8 so as to be taken from the mold 20.

The basic manufacturing method of the ink supply member 10 has been described referring to FIGS. 5A to 7B. The specific structure and the manufacturing method of the ink supply member according to the present invention will be described referring to FIGS. 8A and 8B.

Figure 8A:
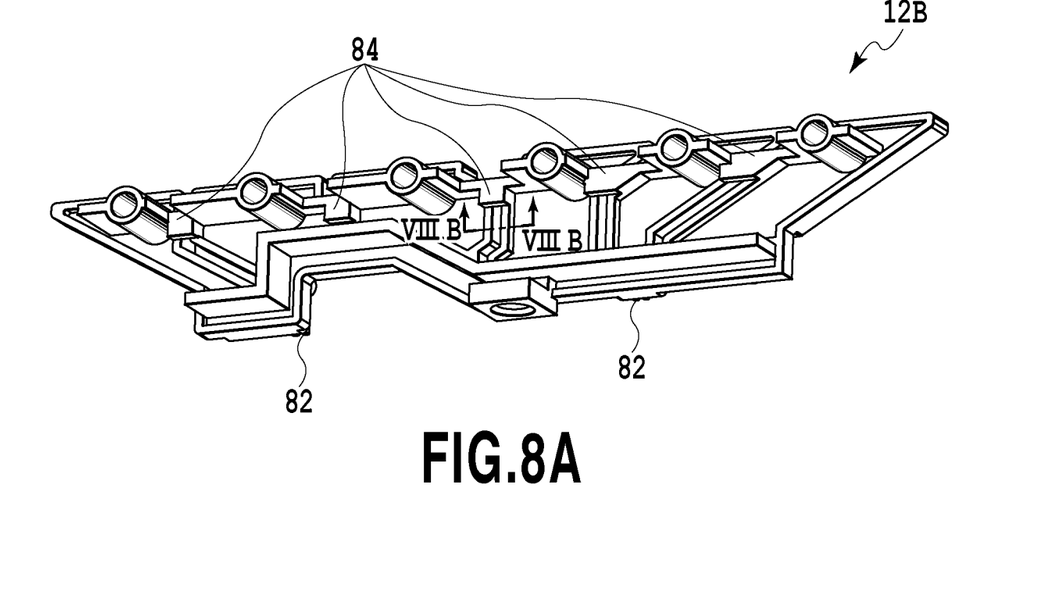
FIG. 8A is a perspective view of one component of the ink supply member as shown in FIGS. 1A and 1B.

FIG. 8A is a perspective view of the lid member 12B, the front side of which (in the drawing) corresponds to the outer side when it is joined to the housing 11, and the far side of which corresponds to the side of the ink chamber 10A. The lid member 12B seen from the opposite side is shown in the perspective view of FIG. 3.

The lid member 12B is configured to cover the third openings of the plurality of ink chambers 10A (in this example, six ink chambers 10A in an array) formed in the housing 11. As the lid member 12B covers the third openings, a hollow portion is formed between the lid member 12B and the housing 11. The lid member 12B and the housing 11 are tightly joined by filling the contact portion with the sealing material (secondary resin).

Figure 8B:
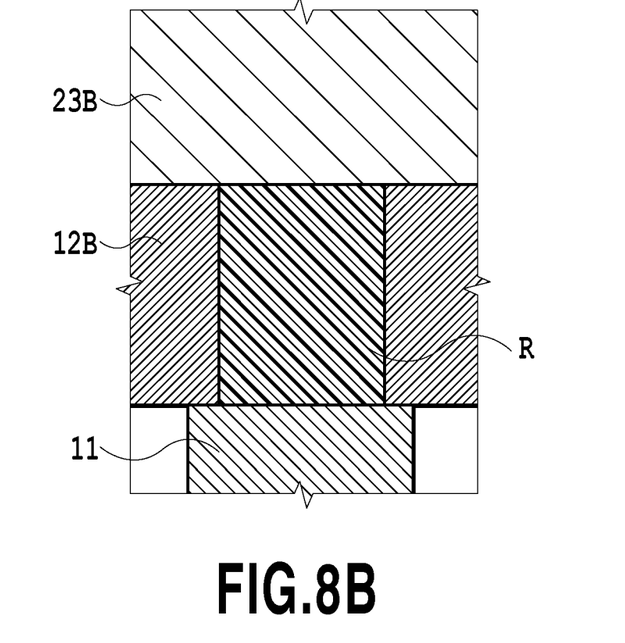
FIG. 8B is a partial sectional view taken along line VIIIB-VIIIB of FIG. 8A.

FIG. 8B is a partial sectional view taken along line VIIIB-VIIIB of FIG. 8A, representing the secondary molding process for feeding the sealing material (secondary resin) from the injection nozzle into a contact portion between the peripheral edge of the third opening of the ink chamber 10A and the corresponding lid member 12B in the closed mold.

The flow channel through which the secondary resin flows is defined between the lid member 12B and the housing 11. Specifically, the flow channel is defined by the surface of the lid member 12B and the surface of the peripheral edge of the third opening.

In the example shown in FIG. 8B, one surface of the flow channel is opened so that the secondary resin R flowing through the flow channel is brought into contact with the mold 23B. The mold temperature can be controlled, which allows easy control of temperature of the secondary resin R in the flow channel. The secondary resin temperature is controlled to keep fluidity of the molten secondary resin, and improve filling properties into the flow channel. The secondary resin R in the molten state is filled into the flow channel from a gate 82.

The flow channel is formed along each peripheral edge of the plurality of third openings. In the aforementioned structure which allows easy temperature control of the secondary resin R, the lid member 12B before it is joined to the housing 11 is branched from a part near the gate as the common section into sections corresponding to positions for covering the plurality of third openings. Accordingly, the lid member 12B before joining has a shape with very weak strength.

After execution of the primary molding through the aforementioned manufacturing method, the lid member 12B has to be retained by the movable-side mold upon opening of the mold. However, the lid member has a part with weak strength as described above, which may be damaged due to mold release resistance, resulting in the risk of leaving the lid member 12B at the opposite side (fixed-side mold). In the embodiment, bridge structures 84 are provided to connect the respective branched sections as shown in FIG. 8A.

The bridge structures 84 may be provided to the positions other than the common section near the gate so that the respective branched sections are connected for reinforcement. Provision of the bridge structure 84 at the position from the common section near the gate as far as possible may provide high reinforcing effect.

Meanwhile, at the position provided with the bridge structure 84, the flow channel is defined only by the surfaces of the lid member 12B and the housing 11. As a result, the secondary resin flowing through the flow channel cannot be brought into contact with the mold. At the position as described above, the temperature of the secondary resin cannot be controlled (heating, maintaining temperature) by means of the mold. For example, in the case of long flow channel, upon decrease in the secondary resin temperature, the fluidity is deteriorated, thus causing the risk of filling failure. In such a case, it is preferable to provide the bridge structure 84 at the position which ensures the secondary resin temperature at the final filling portion to be maintained appropriately. For example, it is preferable to provide the bridge structure 84 at the side closer to the gate than the final filling portion. For example, it is preferable to provide the bridge structure 84 at the side closer to the gate than the intermediate portion between the gate and the final filling portion.

The embodiment has been described by taking the ink supply member of the inkjet print head as an example. However, the present invention is not limited to the example as described above, but may be applied to the molded member in general for constituting the inkjet print device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-105182, filed May 25, 2015, which is hereby incorporated by reference wherein in its entirety.

What is claimed is:

1. A molded part, comprising:
   a first component including a plurality of chambers and a plurality of openings, each of the chambers having an opening;
   a second component formed of a primary resin, the second component having a plurality of sections corresponding to the plurality of openings respectively and contacting a plurality of peripheral edges of the plurality of openings so that each of the sections covers a corresponding opening; and
   a sealing material formed of a secondary resin, which seals a plurality of contact portions between the plurality of peripheral edges and the second component,
   wherein the second component has a plurality of bridge structures, each of which connects two adjacent sections among the plurality of sections.

2. The molded part according to claim 1, wherein the molded part is a liquid supply member of an inkjet print head capable of ejecting liquid from a plurality of ejection ports, and
   wherein each of the plurality of chambers forms a supply channel through which the liquid is supplied to the inkjet print head.

3. The molded part according to claim 1, wherein the plurality of openings of the first component and the plurality of sections of the second component are formed into an array.

4. The molded part according to claim 1, wherein the sealing material is fed into a flow channel formed between the first component and the second component along the plurality of peripheral edges.

5. The molded part according to claim 1, wherein the sealing material is fed into a flow channel formed between the first component and an inner surface of a mold along the plurality of peripheral edges.

* * * * *